(12) United States Patent
Schlieffers

(10) Patent No.: US 6,883,713 B2
(45) Date of Patent: *Apr. 26, 2005

(54) HAND-HELD BAR CODE READER WITH EYELET OR HOOK

(75) Inventor: Jorg Schlieffers, Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 128 days.

This patent is subject to a terminal disclaimer.

(21) Appl. No.: 09/941,052

(22) Filed: Aug. 28, 2001

(65) Prior Publication Data
US 2002/0148902 A1 Oct. 17, 2002

(51) Int. Cl.⁷ .................................................. G06K 7/10
(52) U.S. Cl. .......................... 235/472.01; 235/462.43; 235/462.45
(58) Field of Search ....................... 235/472.01, 472.02, 235/472.03, 462.45, 462.43, 462.44, 454; D14/426–428, 420, 431

(56) References Cited

U.S. PATENT DOCUMENTS

| | | | | |
|---|---|---|---|---|
| 4,210,802 A | * | 7/1980 | Sakai | 235/483 |
| D293,795 S | * | 1/1988 | Yamamoto | D14/428 |
| 4,818,847 A | * | 4/1989 | Hara et al. | 235/455 |
| 4,818,856 A | * | 4/1989 | Matsushima et al. | 235/462.45 |
| D357,240 S | * | 4/1995 | Kitazumi et al. | D14/429 |
| 5,773,806 A | * | 6/1998 | Longacre, Jr. | 235/462.1 |
| 5,828,052 A | * | 10/1998 | Reynolds et al. | 235/472.01 |
| D406,126 S | * | 2/1999 | Massieu et al. | D14/428 |
| D408,532 S | * | 4/1999 | Schmidt et al. | D14/428 |
| 6,036,096 A | * | 3/2000 | Evers et al. | 235/472.01 |
| 6,123,265 A | * | 9/2000 | Schlieffers et al. | 235/472.01 |
| D458,263 S | * | 6/2002 | Meksavan et al. | D14/426 |

* cited by examiner

Primary Examiner—Diane I. Lee
(74) Attorney, Agent, or Firm—Kirschstein, et al.

(57) ABSTRACT

A hand-held optical scanning device has a body gripped between distal and proximal ends thereof. An optical scanner disposed therein is arranged to scan objects in a direction which is outward from the distal end. A first resilient member is located at the distal end and forms a first resting surface. A second resilient member is located at the proximal end and forms a second resting surface for the device, as well as either an eyelet or hook for supporting the device.

5 Claims, 5 Drawing Sheets

HAND-HELD BAR CODE READER WITH EYELET OR HOOK

BACKGROUND OF THE INVENTION

1. Field of the Invention

The invention relates to optical scanners for bar code reading and in particular to the housing structure and ergonomics of a hand-held bar code reader.

2. Description of the Related Art

Various optical scanning systems and readers have been developed heretofore for reading indicia such as bar code symbols appearing on a label or on the surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the spatial pattern represented by the graphic indicia into a time-varying electrical signal, which is in turn decoded into data which represent the information or characters encoded in the indicia that are intended to be descriptive of the article or some characteristic thereof. Such data is typically represented in digital form and utilized as an input to a data processing system for applications in point-of-sale processing, inventory control distribution, transportation and logistics, and the like. Scanning systems and readers of this general type have been disclosed, for example, in U.S. Pat. Nos. 4,251,798; 4,369,361; 4,387,297; 4,409,470; 4,760,248; 4,896,026; 5,015,833; 5,262,627; 5,504,316; 5,625,483; and 6,123,265, all of which have been assigned to the same assignee as the instant application and each of which is hereby incorporated by reference herein. As disclosed in some of the above patents, one embodiment of such a scanning system resides, inter alia, in a hand-held, portable laser scanning device supported by a user, which is configured to allow the user to aim a scanning head of the device, and more particularly, a light beam, at a targeted symbol to be read. U.S. Pat. No. 6,123,265 discloses resilient supports for defining a resting surface for the device.

The light source in a laser scanner bar code reader is typically a semiconductor laser. The use of semiconductor devices as the light source is especially desirable because of their small size, low cost and low voltage requirements. The laser beam is optically modified, typically by an optical assembly, to form a beam spot of a certain size at the target distance. It is often preferred that the cross section of the beam spot measured in the scanning direction at the target distance be approximately the same as the minimum width in the scanning direction between regions of different light reflectivity, i.e., the bars and spaces of the symbol. Although typical readers utilize a single laser source, other bar code readers have been proposed with two or more light sources of different characteristics, e.g., different frequencies.

In the laser beam scanning systems known in the art, a single laser light beam is directed by a lens or other optical components along the light path toward a target that includes a bar code symbol on the surface. The moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the pattern of the symbol, or scan the field of view of the scanner, or do both. The laser beam may be moved by optical or opto-mechanical means to produce a scanning light beam. Such action may be performed by either deflecting the beam (such as by a moving optical element, such as a mirror) or moving the light source itself. U.S. Pat. No. 5,486,944 describes a scanning module in which a mirror is mounted on a flex element for reciprocal oscillation by electromagnetic actuation. U.S. Pat. No. 5,144,120 to Krichever et al. describes laser, optical and sensor components mounted on a drive for repetitive reciprocating motion either about an axis or in a plane to effect scanning of the laser beam.

Another type of bar code scanner employs electronic means for causing the light beam to be deflected and thereby scan a bar code symbol, rather than using a mechanical motion to move or deflect the beam. For example, a linear array of closely spaced light sources activated one at a time in a regular sequence may be transmitted to the bar code symbol to simulate a scanned beam for a single source. Instead of a single linear array of light sources, a multiple-line array may also be employed, producing multiple scan lines. Such type of bar code reader is disclosed in U.S. Pat. No. 5,258,605 to Metlitsky et al.

Bar code reading systems also include a sensor or photodetector which detects light reflected or scattered from the symbol. The photodetector or sensor is positioned in the scanner in an optical path so that it has a field of view which ensures the capture of a portion of the light which is reflected or scattered off the symbol, detected, and converted into an electrical signal.

In retroreflective light collection, a single optical component, e.g., a reciprocally oscillatory mirror, such as described in U.S. Pat. No. 4,816,661 or U.S. Pat. No. 4,409,470, both herein incorporated by reference, and Ser. No. 08/727,944, filed Oct. 9, 1996, scans the beam across a target surface and directs the collected light to a detector. The mirror surface usually is relatively large to receive as much incoming light as is possible, only a small detector being required since the mirror can focus the light onto a small detector surface, which increases signal-to-noise ratio.

Of course, small scan elements are preferable because of the reduced energy consumption and increased frequency response. When the scan element becomes sufficiently small, however, the area of the scanning mirror can no longer be used as the aperture for the received light. One solution is to use a staring detection system (a non-retroreflective system) which receives a light signal from the entire field which the scanned laser spot covers.

In non-retroreflective light collection, the reflected laser light is not collected by the same optical component used for scanning. Instead, the detector is independent of the scanning beam, and is typically constructed to have a large field of view so that the reflected laser light traces across the surface of the detector. Because the scanning optical component, such as a rotating mirror, need only handle the outgoing light beam, it can be made much smaller. On the other hand, the detector must be relatively large in order to receive the incoming light beam from all locations in the scanned field.

Electronic circuitry and software decode the electrical signal into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process of bar code reading systems usually works in the following way. The analog signal from the sensor or photodectector may initially be filtered and processed by circuitry and/or software. The pulse width modulated digitized signal is applied to a software algorithm, which attempts to decode the signal. If the start and stop characters and the characters between them in the scan were decoded successfully and completely, the decoding process terminates and an indicator of a successful read (such as a green light and/or audible beep) is provided to the user. Otherwise, the decoder receives the next scan, and performs another decode according to symbology specification into a binary representation of the data encoded in the symbol, and to the alphanumeric characters so represented.

The binary data is communicated to a host computer by an interface cable or wireless communication link. The interface cable may be a "smart cable" such as that described in U.S. Pat. Nos. 5,664,229 and 5,675,139, the contents of which are hereby incorporated by reference herein.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) is referred to as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies is in widespread use including UPC/EAN, Code 39, Code 128, Codeabar, and Interleaved 2 of 5.

In order to increase the amount of data that can be represented or stored on a given amount of surface area, several more compact bar code symbologies have been developed. One of these code standards, Code 49, exemplifies a "two dimensional" symbol by reducing the vertical height of a one-dimensional symbol, and then stacking distinct rows of such one dimensional symbols, so that information is encoded both vertically as well as horizontally. That is, in Code 49, there are several rows of bar and space patterns, instead of only one row as in a "one dimensional" symbol. The structure of Code 49 is described in U.S. Pat. No. 4,794,239. Another two-dimensional symbology, known as "PDF417", is described in U.S. Pat. No. 5,304,786.

Still other symbologies have been developed in which the symbol is comprised not of stacked rows, but a matrix array made up of hexagonal, square, polygonal and/or other geometric shapes, lines, or dots. Such symbols are described in, for example, U.S. Pat. Nos. 5,276,315 and 4,794,239. Such matrix code symbologies may include Vericode, Datacode, and MAXICODE.

Moving-beam laser scanners are not the only type of optical instruments capable of reading bar code symbols. Another type of bar code reader is an imager, which incorporates detectors based on solid state imaging arrays or charge coupled device (CCD) technology. In such prior art readers, the size of the detector is typically smaller than the symbol to be read because of the image reduction by the objective lens in front of the array or CCD. The entire symbol is flooded with light from a light source, such as light emitting diodes (LED), and each cell or pixel in the array is sequentially read out to determine the presence of a bar or a space in the field of view of that cell.

The working range of CCD bar code scanners is rather limited as compared to laser-based scanners and is especially low for CCD based scanners with an LED illumination source. U.S. patent application Ser. No. 09/096,578, filed Jun. 12, 1998, describes an improved illumination source, and is hereby incorporated by reference. Other features of CCD based bar code scanners are set forth in U.S. Pat. No. 5,396,054 which is hereby incorporated by reference, and in U.S. Pat. No. 5,210,398. These references are illustrative of the certain technological techniques proposed for use in CCD type scanners to acquire and read indicia in which information is arranged in a two dimensional pattern. CCD readers may be used in conjunction with moving-beam laser scanners for bar code reading, such as described in U.S. Pat. No. 5,672,858, the contents of which are hereby incorporated by reference herein.

In addition, there are currently two different types of CMOS imagers known today, active pixel sensor (APS) and active column sensor (ACS) imagers. APS CMOS imagers are constructed by placing an amplifier inside each pixel. The placement of the amplifier inside each pixel reduces the light gathering portion of the pixel, i.e., the fill factor of each pixel, and reduces the dynamic range of the pixel. In addition, variations in the manufacturing prices of APS CMOS imagers cause a fluctuation in the gain and offset of each of the amplifiers. These fluctuations may result in each pixel responding differently to the same amount of input light. The different responses of each pixel can create noise.

ACS CMOS imagers employ a true unity gain amplifier which is shared by each pixel in each column of pixels. As compared to APS CMOS imagers, ACS CMOS imagers use only an input transistor inside each pixel. APS CMOS imagers' use of only an input transistor inside each pixel, as compared to the use of an amplifier inside each pixel as in APS CMOS imagers, increases the fill factor and dynamic range of the imagers.

SUMMARY OF THE INVENTION

1. Objects of the Invention

It is a general object of the present invention to provide an improved housing structure for a small, lightweight bar code reader.

It is another object of the invention to provide a bar code reader with a resting stand.

It is a further object of the present invention to provide a bar code reader with a mounting loop for being suspended by a hook.

It is a still further object of the present invention to provide an indicia scanner with a spacer to prevent targets to be read from being placed too close to the window.

It is an even further object of the invention to provide a method which can be used to accomplish one or more of the above objects.

Additional objects, advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

2. Features of the Invention

In keeping with these objects, and others which will become apparent hereinafter, one feature of this invention resides, briefly stated, in an optical reader for reading indicia having parts of different light reflectivity, e.g., bar code symbols having alternating bars and spaces, with a body having a distal end and a proximal end, adapted to be held in a hand of a user by the body being gripped between the distal and proximal ends, and having an optical scanner disposed therein and arranged to scan objects in a direction which is outward from the distal end. A first resilient member is located at said distal end and forms a first resting surface for the reader. A second resilient member is located at the proximal end and forms a second resting and/or supporting surface for the reader.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENTS

Figure 1A:
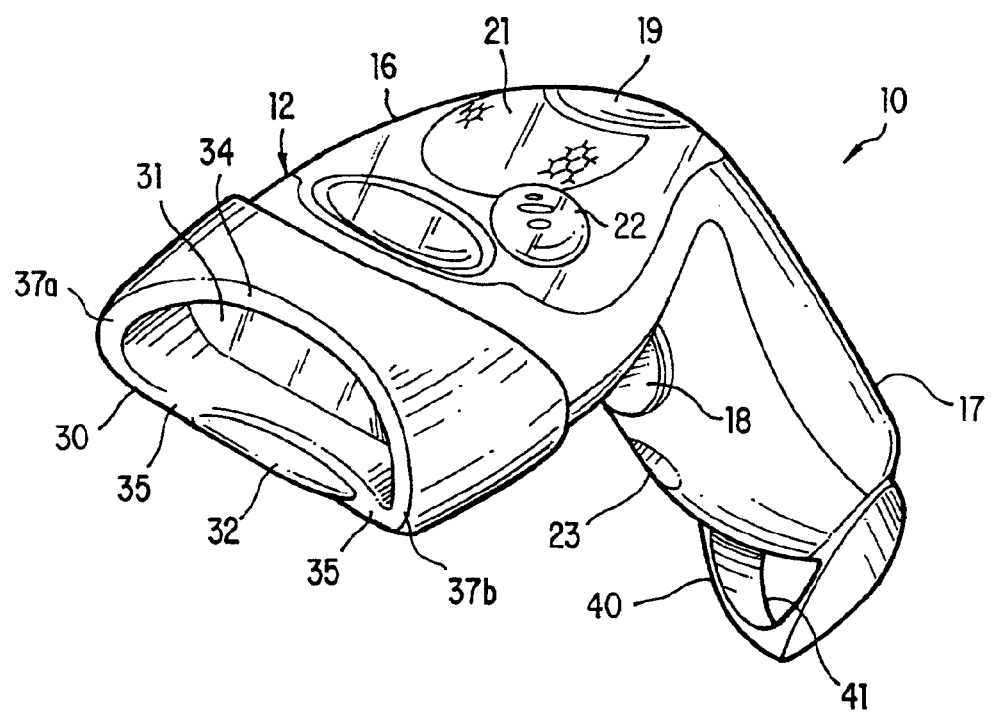
FIGS. 1a and 1b are perspective views of triggered end triggerless bar code readers according to first and second embodiments of the present invention.
Figure 1B:
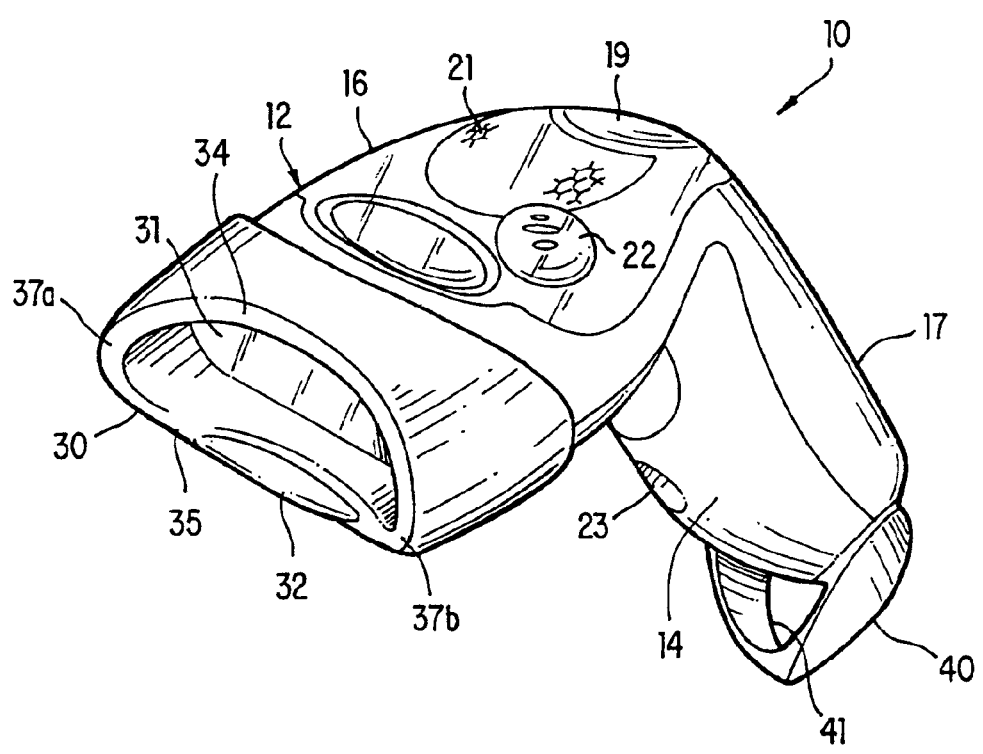
Figure 2:
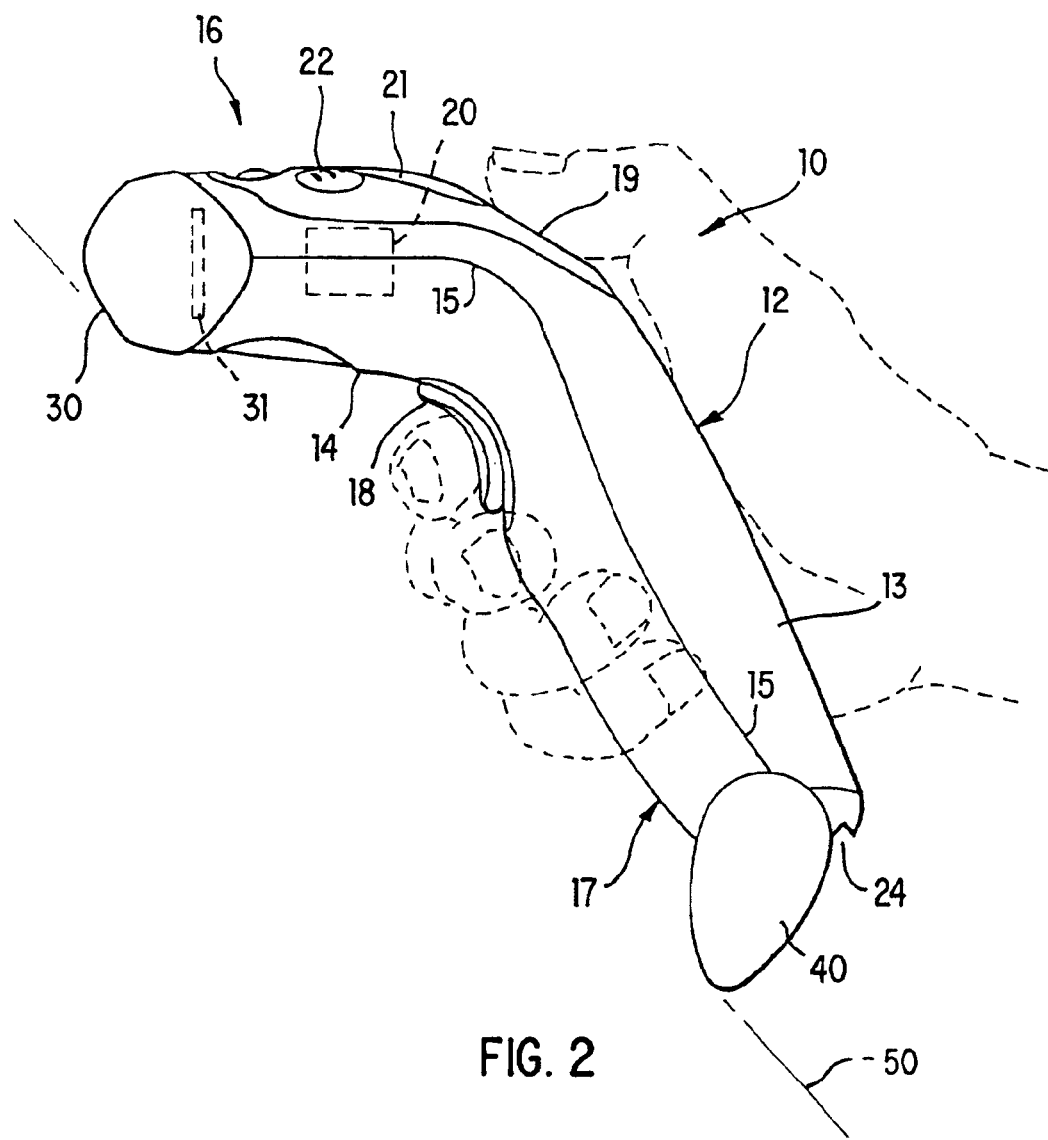
FIG. 2 is a side view of the reader of FIG. 1 being grasped by a user.
Figure 3:
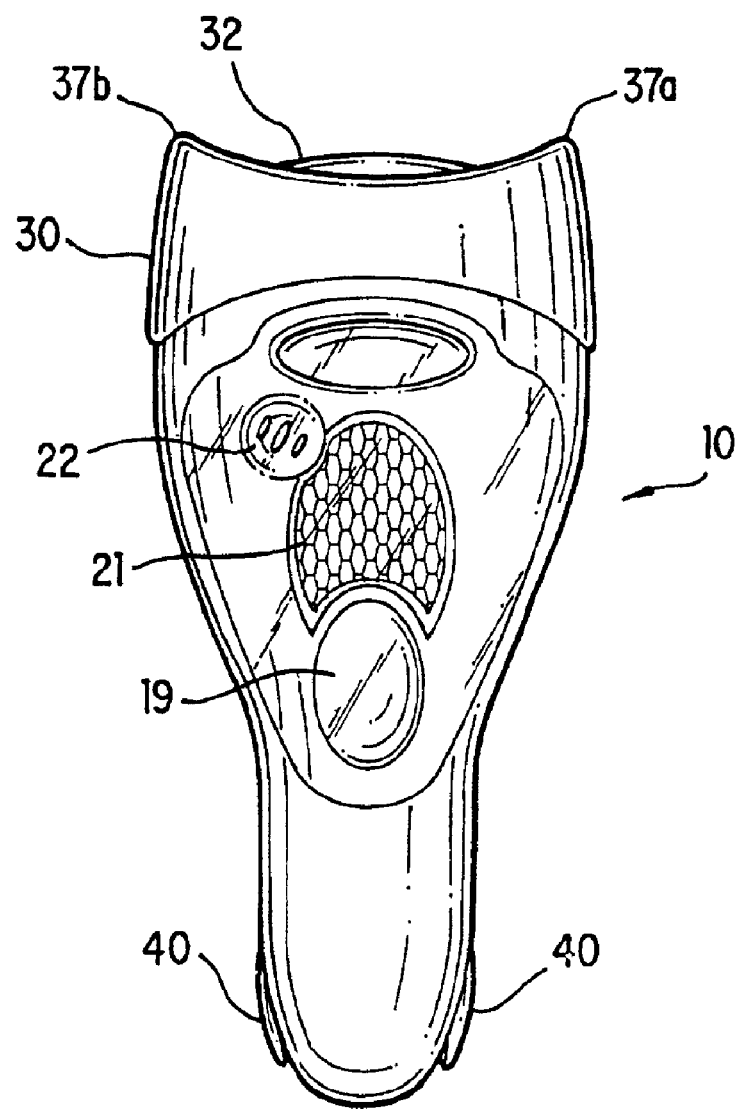
FIG. 3 is a top plan view of the reader of FIG. 1.

Referring to FIGS. 1a, 1b and 2, a bar code reader 10 is provided with a body portion 12 and an optical scanning module 20 is provided at a first distal end of body portion 12 for scanning objects in a direction that is outward from the distal end. It should be recognized that the optical scanning module may have a different location as long as it has an optical path outward from the distal end. The body portion 12 has a head portion 16 and a handle portion 17 and has a V-shaped configuration. Body portion 12 includes a lower housing member 14 which is joined to an upper housing member 13. The upper and lower members or halves 13 and 14 of the body portion 12 may be joined at line 15 so that body portion 12 may be assembled by conventional means, such as screws or snap-in fittings, or may be integrally molded. Numeral 23 (see FIG. 4) denotes a screw hole for such assembly, and reference numeral 18 in FIG. 1a is the trigger to activate scanning. The reader of FIG. 1b has no trigger.

In particular, as shown in FIG. 2, the body portion 12 is adapted to be held in a hand of a user by the body being gripped between the distal and proximal ends, the thumb resting on indentation 19, with the optical scanner module 20 disposed therein and arranged to scan objects in a direction which is outward from the distal end.

An eyelet, preferably made of a hard rubberized material, extends through an aperture 41 in a resilient number 40, the scanner to be hung on a hook, pin, stud, etc. extending through the aperture for quick and easy storage in between use. Alternatively, the eyelet may be configured to be mounted on a vertical pin or stud on a work surface so as to form a stand and position the scanner for use over a scanning field. Alternatively, instead of an eyelet, a hook (not shown) may be used on the reader 10 to suspend the reader from a support.

Another resilient member 30 is located at the distal end, which forms a first resting surface for the reader, and the resilient member 40, located at the proximal end, forms a second resting surface for the reader, where reference numeral 50 denotes a rest plane on which the reader may be placed on a support surface.

The bar code reader 10 includes conventional components used in such devices, including the optical scanning module 20, a window 31 through which light passes, a microcomputer for acquiring data, a visual indicator 21, an acoustic outlet 22, and an electrical connector 24. Where the device is wireless, there may be provided a radio transceiver for sending and receiving data, such as inventory data, to and from a master station or a nearby cash register, such as a checkout station or to and from another scanning device. The radio transceiver may be coupled to a local area wireless network as well. Alternately, a cable or cord providing power and data communications may be provided to the connector 24.

An additional feature of the preferred embodiments shown in FIGS. 1a, 1b and 2 is that the surface of the forward edge of resilient member 30 stabilizes the resting configuration of the reader 10. This support at extreme points 37a and 37b enables the reader 10 to be conveniently rested against a flat horizontal surface in a stable position without tilting. The place of a resting surface is shown by the line 50 of FIG. 2. The resting configuration is further improved by a ridge or lip 32 on a lower surface edge 35, which may also include a rounded surface, shown in FIG. 4 for providing a stable rest configuration.

The resilient member 30 preferably is rubberized, with upper and lower surface edges 34 and 35, respectively. The lower surface edge 35 with the lip 32, also functions to form a point of contact with a surface 36 of a cylindrical object (see FIG. 4) placed near the window 31. The point or surface of contact in the resilient member 40 provides stability for the scanner when it is placed on flat surfaces, such as for example table tops, or on the scanning surface itself. Alternatively, the scanner may be held in one's hand by the user without any contact with the scanned surface.

Figure 4:
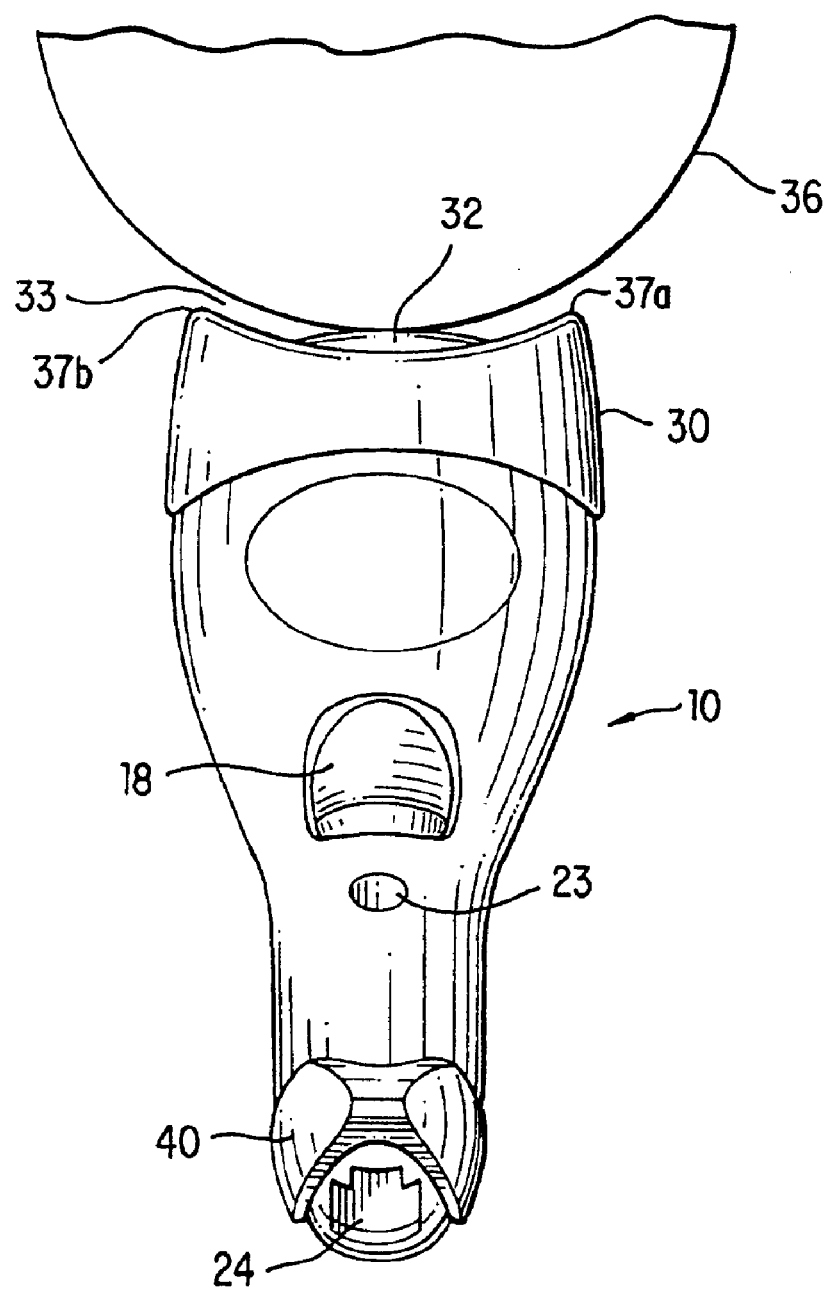
FIG. 4 is a bottom plan view of the reader of FIG. 1 coming in close contact with a target to be read.

As shown more clearly in FIG. 4, the lower surface edge 35 with the rubberized lip 32 protruding from it, acts as a spacer to separate the scanner from the scanned surface 36, limiting the minimum distance between the scanned symbol and the scanner. Note the space 33 in FIG. 4. Thus, when the reader head is either held by the user or dragged over the scanned surface, the rubberized lip 32 maintains the closest distance at which a bar code symbol can be read by the scanner.

Although the invention has been discussed with reference to certain scanner housings, triggering mechanisms and other features of the disclosed embodiment, it will be understood that a variety of housing styles and shapes and triggering mechanisms could be used. Other conventional features of bar code reading systems can also be included if so desired. The invention is preferably implemented using miniaturized components such as those described herein or in the materials referenced herein, or otherwise known in the art. However, the scanner of the present invention is not limited to use in portable devices and can also be easily adapted for use in a stationary housing either of the "table top" or "projection" variety, or so called conveyer belt or tunnel scanning systems, wherein the item on which the symbol resides is moved across the scanner head.

Additionally, even though the present invention has been described with respect to reading one dimensional bar codes, it is not limited to such embodiments, but may also be applicable to more complex indicia scanning or data acquisition applications such as two dimensional bar codes and matrix array symbols comprised of geometric shapes. It is conceivable that the present invention may also find application for use with various machine vision or optical character recognition applications in which information is derived from indicia such as printed characters or symbols, or from the surface or configurational characteristics of the article being scanned.

In addition to being packaged in specific housings, the elements of the module 20 may be implemented in a very compact assembly or OEM subassembly such as a single integral module or "scan engine". Such a module can interchangeably be used as the dedicated scanning element for a variety of different operating modalities and types of data acquisition systems. For example, the module may be alternatively used in a hand-held manner, in a table top gooseneck scanner attached to a flexible arm or mounting extending over the surface of the table or attached to the underside of the table top, or as a subcomponent or subassembly of a more sophisticated data acquisition system such as a tunnel scanner system.

Each of these different implementations is associated with a different modality of reading bar code or other symbols. Thus, for example, the hand-held scanner is typically operated by the user aiming the scanner at the target; and the table top scanner operated while the target is moved rapidly through the scan field, or presented to a scan pattern which is imaged on a background surface. Still other modalities within the scope of the present invention envision the articles being moved past a plurality of scan modules oriented in different directions so that the field of view allows at least one scan of a symbol which may be arbitrarily positioned on the article.

The module 20 could advantageously comprise various optic subassemblies mounted on a support, and photodetection components, such as a photodiode, charge coupled or solid state imaging device. Control or data lines associated with such components may be connected to an electrical connector mounted to enable the module to be electrically connected to a mating connector associated with other elements of the data acquisition system.

An individual module may have specific scanning or decoding characteristics associated with it, e.g., operability at a certain working distance, or operability with one or more specific symbologies or printing densities. The characteristics may also be defined through the manual setting of control switches associated with the module. The user may also adapt the data acquisition system to scan different types of articles or the system may be adapted for different applications by interchanging modules in the data acquisition system through the use of a simple electrical connector.

The scanning module described above may also be implemented within a self-contained data acquisition unit including one or more such components as a keyboard, display, printer, data storage, application software, and databases. Such a unit may also include a communications interface to permit the data acquisition unit to communicate with a host computer, or other components of a data processing system, or with remote computers through a local or wide area network or with the telephone exchange network, either through a modem or an ISDN, XDSL, or cable interface, or by low power radio broadcast from a portable terminal to a stationary or mobile receiver and thereafter to other system components.

It will be understood that each of the features described above, or two or more together, may find a useful application in other types of scanners and readers differing from the types described above.

While the invention has been illustrated and described as embodied in a hand-held reader with an eyelet or hook, it is not intended to be limited to the details shown, since various modifications and structural changes may be made without departing in any way from the spirit of the present invention.

I claim:

1. A reader for electro-optically reading indicia, comprising:
   a) a housing having a body portion extending along a longitudinal direction to one end region of the housing, a light-transmissive window at said one end region, and a handle portion extending along a handle direction to an opposite end region of the housing;
   b) an actuatable scanner mounted within the housing for electro-optically scanning the indicia with light passing through the window during a reading mode;
   c) a trigger on the handle portion for manually actuating the scanner from a non-reading mode in which the indicia is not scanned, to the reading mode;
   d) a first, annular, resilient member mounted at said one end region and surrounding the window, the first member having upper, lower and side edges extending along the longitudinal direction past the window away from the body portion, the side edges extending further from the window than the upper and lower edges and constituting a pair of front contact zones spaced apart from one another;
   e) a second resilient member mounted at said opposite end region and having side walls extending away from opposite sides of the handle portion, said side walls of the second member meeting at a bottom edge constituting a rear contact zone which, together with the front contact zones, simultaneously support the housing at three individual contact zones spaced apart from each other on a generally planar resting surface in the non-reading mode when the handle portion is not held by a user, the side walls having front and rear edges;
   f) an eyelet extending through the second resilient member from the front edge between the side walls through the rear edge lengthwise of the handle portion alone the handle direction, for alternatively supporting the housing in the non-reading mode when the handle portion is not held by the user; and
   g) a spacer on the first resilient member, for spacing the window at a given minimum distance from the indicia to be read in the reading mode.

2. The reader of claim 1, wherein each resilient member is constituted of a hard rubber.

3. The reader of claim 1, wherein the upper and lower edges are convexly curved.

4. The reader of claim 3, wherein the spacer is integral with the lower edge and is concavely curved.

5. The reader of claim 1, wherein the longitudinal direction of the body portion and the handle direction of the handle portion form an obtuse angle with each other.

* * * * *